US005744246A

United States Patent [19]

Ching

[11] Patent Number: 5,744,246
[45] Date of Patent: Apr. 28, 1998

[54] OXYGEN SCAVENGING RIBBONS AND ARTICLES EMPLOYING THE SAME

[75] Inventor: Ta Yen Ching, Novato, Calif.

[73] Assignee: Chevron Chemical Company, San Ramon, Calif.

[21] Appl. No.: 740,366

[22] Filed: Oct. 28, 1996

Related U.S. Application Data

[63] Continuation of Ser. No. 321,728, Oct. 12, 1994, abandoned, which is a continuation-in-part of Ser. No. 308,136, Sep. 19, 1994, Pat. No. 5,450,994.

[51] Int. Cl.$^6$ .................. B32B 3/10; B32B 27/34
[52] U.S. Cl. .................. 428/474.4; 428/35.7; 428/35.8; 428/35.9; 428/34.3; 428/34.6; 428/34.8; 428/477.7; 428/475.5; 428/475.8; 428/500; 428/522
[58] Field of Search ................ 428/474.4, 35.7, 428/35.8, 35.9, 34.3, 34.6, 34.8, 477.7, 475.5, 475.8, 500, 522

[56] References Cited

U.S. PATENT DOCUMENTS

| | | | |
|---|---|---|---|
| 3,670,874 | 6/1972 | Brunner | 206/46 |
| 4,061,785 | 12/1977 | Nishino et al. | 426/124 |
| 4,536,409 | 8/1985 | Farrel | 426/398 |
| 5,021,515 | 6/1991 | Cochran et al. | 525/371 |
| 5,049,624 | 9/1991 | Adams et al. | 525/371 |

FOREIGN PATENT DOCUMENTS

| | | |
|---|---|---|
| 0402217 | 12/1990 | European Pat. Off. . |
| 0466515 | 1/1992 | European Pat. Off. . |
| 2025430 | 9/1970 | France . |
| 2040254 | 1/1971 | France . |
| 2020622 | 11/1971 | Germany . |
| 2207439 | 2/1989 | United Kingdom . |
| 9113556 | 9/1991 | WIPO . |

*Primary Examiner*—W. Robinson H. Clark
*Attorney, Agent, or Firm*—Burns, Doane, Swecker & Mathis, L. L. P.

[57] ABSTRACT

An oxygen scavenging ribbon comprises a heat sealable resin and an oxygen scavenging material. This ribbon, upon oxidation of the oxygen scavenging material, does not release significant amounts of byproducts which are odorous and/or non-GRAS food additives. This ribbon can be in a number of forms including a multilayer casting or blown film tube. This ribbon provides a great deal of flexibility in the scavenging of oxygen within packaging environments.

21 Claims, 3 Drawing Sheets

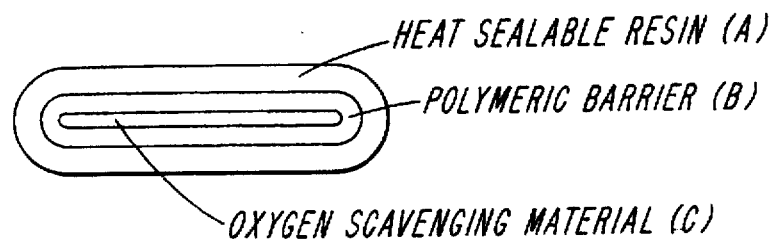
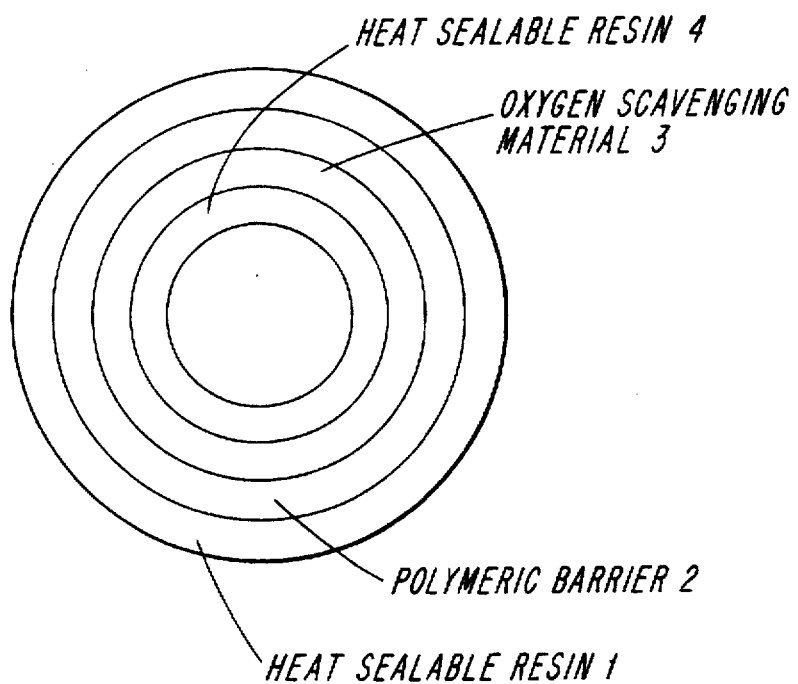

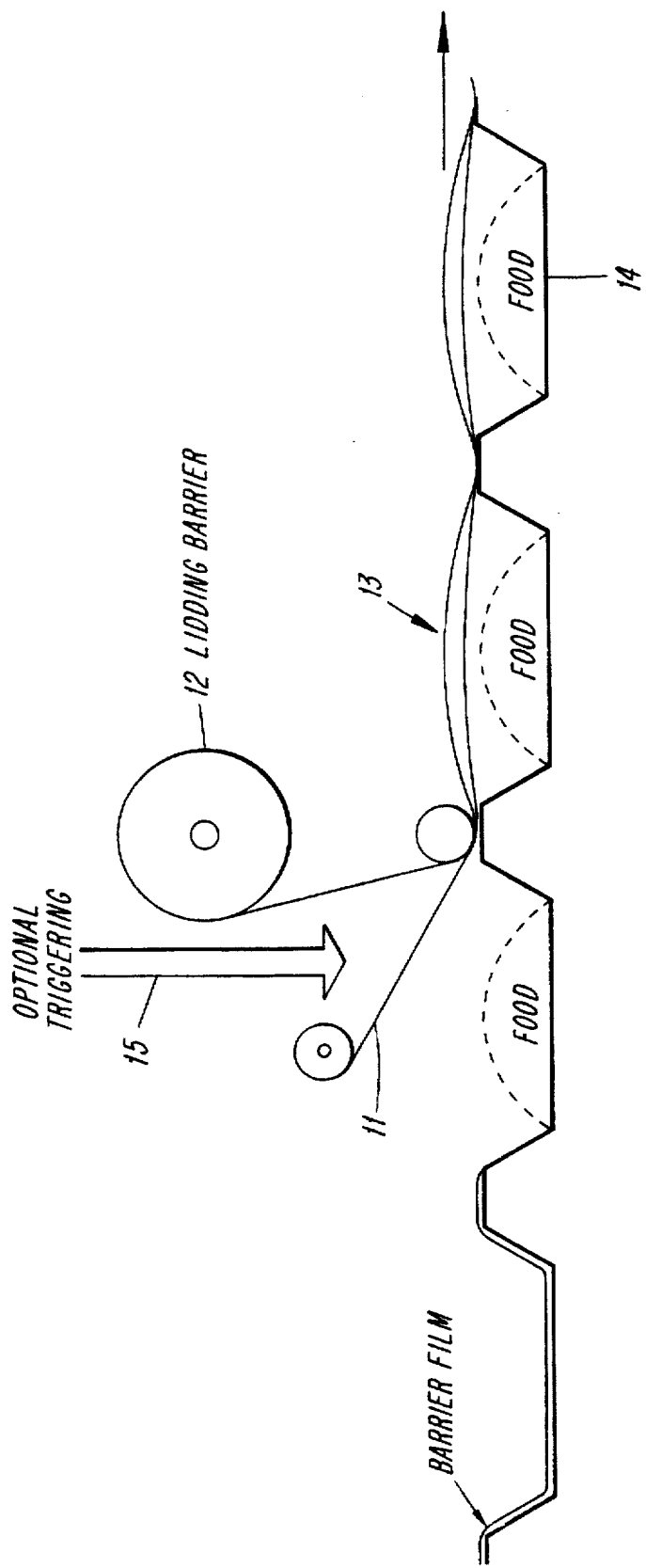

OXYGEN SCAVENGING RIBBONS AND ARTICLES EMPLOYING THE SAME

This instant application is a continuation of application Ser. No. 08/321,728, filed on Oct. 12, 1994 now abandoned, which is a continuation-in-part of application Ser. No. 08/308,136, filed on Sep. 19, 1994, now U.S. Pat. No. 5,450,994.

FIELD OF THE INVENTION

An improved oxygen scavenging system for use in a variety of packaging environments particularly food and beverage-containing products and packages involves the use of an oxygen scavenging ribbon.

BACKGROUND OF THE INVENTION

It is well known that reducing the exposure of oxygen-sensitive products to oxygen can maintain and enhance the quality and "shelf-life" of the product. For instance, by limiting the oxygen exposure of oxygen sensitive food products in a packaging system, the quality of the food product can be maintained, freshness can be extended and food spoilage can be delayed. In addition, such packaging also keeps the product in inventory longer, thereby reducing costs incurred from waste and having to restock inventory. In the food packaging industry, several means for regulating oxygen exposure have already been developed. These means include modified atmosphere packaging (MAP) and oxygen barrier film packaging.

One method currently being used is "active packaging", whereby the package for the food product is modified in some manner to regulate the food product's exposure to oxygen. The inclusion of oxygen scavengers within a cavity of the package is one form of active packaging. Typically, such oxygen scavengers are in the form of sachets which contain a composition which scavenges the oxygen through oxidation reactions. One sachet contains iron-based compositions which oxidize to their ferric states. Another type of sachet contains unsaturated fatty acid salts on a particulate adsorbent. See U.S. Pat. No. 4,908,151. Yet another sachet contains metal/polyamide complex. See U.S. Pat. No. 5,194,478.

However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate. Further, the sachets can present a danger to consumers if accidentally ingested.

Another means for regulating the exposure to oxygen involves incorporating an oxygen scavenger into the packaging structure itself. A more uniform scavenging effect throughout the package is achieved by incorporating the scavenging material in the package itself instead of adding a separate scavenger structure (e.g., a sachet) to the package. This may be especially important where there is restricted air flow inside the package. In addition, incorporating the oxygen scavenger into the package structure provides a means of intercepting and scavenging oxygen as it permeates the walls of the package (herein referred to as an "active oxygen barrier"), thereby maintaining the lowest possible oxygen level in the package.

One attempt to prepare an oxygen-scavenging wall involves the incorporation of inorganic powders and/or salts. See U.S. Pat. Nos. 5,153,038, 5,116,660, 5,143,769, and 5,089,323. However, incorporation of these powders and/or salts cause degradation of the wall's transparency and mechanical properties such as tear strength. In addition, these compounds can lead to processing difficulties, especially when fabricating thin films and multilayer constructions.

The oxygen scavenging systems disclosed in U.S. Pat. Nos. 5,021,515, 5,194,478 and 5,159,005, European Publication EP 0 301 719, and EP 0 380 319 as well as PCT Publication Nos. 90/00504 and 90/00578 illustrate attempts to produce an oxygen-scavenging wall. These patent applications disclose incorporating a metal catalyst-polyamide oxygen scavenging system into the package wall. Other oxidizable polymers employed within the prior art include polyisoprene, polybutadiene, or copolymers thereof.

Such polymers, when made into walls or layers and/or articles exhibit a number of drawbacks however. First, as portions of the polymer backbone are oxidized by oxygen under the catalytic influence of the transition metal, the strength and integrity of the article is reduced as the polymer is broken down. Second, any undesirable products of the oxidation reaction are released at least into the package and thereby, can be mixed with its contents. Third, the optical appearance and the gloss of the surface of the article can be reduced as pitting and molecular decomposition takes place near or at the surface. Moreover, if a triggering or activation of the oxygen scavenger is involved, the accessibility of the triggering means, e.g., UV light or corona discharge may be difficult, particularly in certain environments such as printed bags.

Another approach to scavenging oxygen is disclosed in EP 0 507 207, which discloses an oxygen-scavenging composition comprising an ethylenically unsaturated hydrocarbon and a transition metal catalyst. This patent states that ethylenically unsaturated compounds such as squalene, dehydrated castor oil, and 1,2-polybutadiene are useful oxygen scavenging compositions, and ethylenically saturated compounds such as polyethylene and ethylene copolymers are used as diluents. However, additives such as squalene, castor oil, or other such unsaturated hydrocarbons typically have an oily texture, which can introduce problems, e.g., poor adhesion, in multilayer film construction, and this texture is particularly undesirable for certain applications such as wrapping meat for sale in retail grocery stores. Further, these additives are of a size that introduces problems in terms of migration. Finally, polymer chains which are ethylenically unsaturated would be expected to either cross-link and become brittle or to degrade upon scavenging oxygen, weakening the wall of the package in either case.

In fact, there are certain drawbacks common to any approach in which an oxygen scavenger is an integral part of a packaging film structure. That is, in packaging film manufacturing, warehouse storage, as well as in designing triggering mechanisms for activating the oxygen removal processes, there are many limitations relating to preset, customer and/or structurally specific film processing and distribution conditions, which limitations make the design of a flexible system difficult, if not impossible. These limitations include extrusion temperature, coextrusion layers, film cooling speed, color printing, on line activation, duration of film storage, storage temperatures, and the like.

Accordingly, the need still exists for alternative oxygen scavenging system in which can achieve some or all of the same advantages as that associated with coextruding but without the disadvantages.

SUMMARY OF THE INVENTION

Among other aspects, the present invention is based upon the surprising discovery that an oxygen scavenging ribbon provides a flexibility, i.e., it can be effectively employed in a variety of environments, and can solve a number of problems traditionally associated with oxygen scavenging techniques.

In one aspect, this invention relates to an oxygen scavenging ribbon which comprises a heat sealable polymeric resin on at least the outer surface thereof and an oxygen scavenging material. Moreover, this ribbon, upon oxidation of this oxygen scavenging material, does not release significant amounts of byproducts which are (i) odorous and/or (ii) not GRAS food additives.

In one preferred embodiment, this ribbon can be, for example, a multi-layer film structure in which the oxygen scavenging material is located in and encompassed by a outer layer comprising the heat sealable polymer and an polymeric selective barrier layer which is intermediate the two. In one alternative structure, the ribbon can have a tubular shape, also with a multilayer design.

In other aspects, the present invention relates to articles such as flexible barrier packaging, e.g., bags, and rigid barrier packaging, e.g., bottles and boxes, which include this oxygen scavenging ribbon as well as methods for making the ribbons and the articles.

BRIEF DESCRIPTION OF THE DRAWINGS

FIGS. 1 and 2 are cross-sectional views of two embodiments of the oxygen scavenging ribbon according to the present invention;

FIGS. 3 and 4 illustrate two techniques for producing packages which employ an oxygen scavenging ribbon of the present invention.

DETAILED DESCRIPTION OF THE PREFERRED EMBODIMENTS

Figure 3:
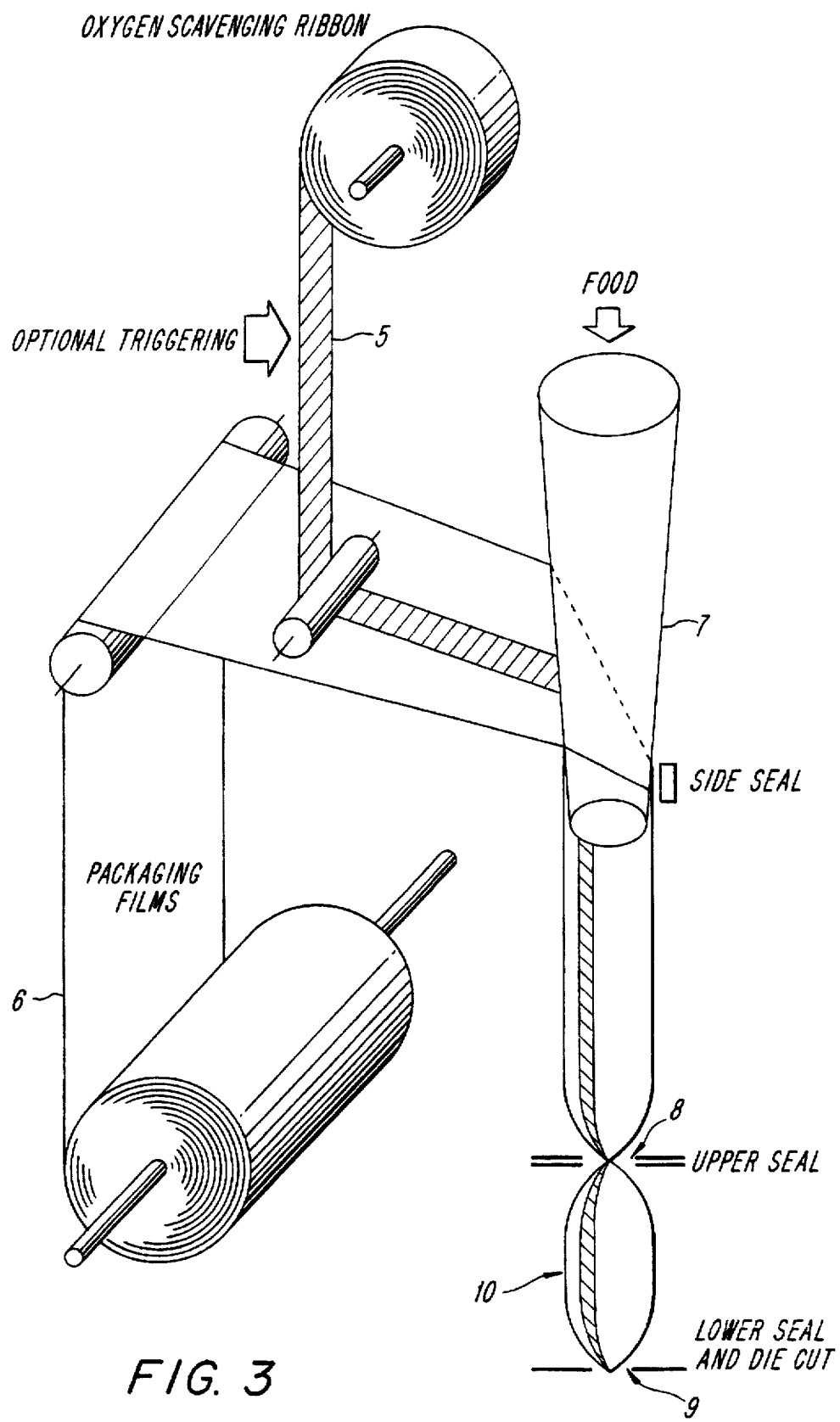

In the present invention, compositions are employed which are effective to scavenge oxygen. The term "scavenge" means to absorb, deplete, or react with oxygen so that substantial amounts of oxygen does not return to the environment from which it is absorbed, depleted, or reacted. In particular, by "oxygen scavenging material" the present invention refers to a material that is capable of scavenging at least 0.5 cc $O_2$/gram of oxygen scavenging material/day/atm. Preferably, the material is capable of scavenging at least about 1, and more preferably at least about 5, cc $O_2$/gram of oxygen scavenging material/day/atm.

These oxygen scavenging materials are employed in the form of a ribbon structure which ribbon is introduced into the desired oxygen scavenging environment.

Further in this regard, although the following discussions relating to certain preferred embodiments of the invention focus on a one piece ribbon arrangement which includes the oxygen scavenging material, it is also within the purview of the present invention to employ a two piece ribbon structure which comprises a plurality of "patches," each of which include an oxygen scavenging material, on a "support tape". In this embodiment, the ribbon can be employed largely in the same manner as those ribbons of the preferred embodiment with the exception that the patches are transferred from the support tape to the package surface and then sealed, for example, by heat sealing and/or an adhesive. The shape of these patches is not critical and can include circular or strips, e.g. the shape of adhesive bandages.

Irrespective of the exact structure, the ribbon preferably has a shape which is substantially longitudinal, i.e., its length is substantially longer than its width. This allows it to be more effectively produced in rolls and then introduced into a variety of packaging systems by way of a continuous operation. However, to the extent it can be effectively incorporated into processing systems in the manner discussed below, the exact shape is not critical to the present invention.

In many applications, the ribbon preferably has a thickness of 0.5 to 10 mil, more preferably 2–3 mil, although the thickness also is not critical to the invention.

As discussed above, in one embodiment, the ribbon comprises at least two materials, a heat sealable polymer which, as will be seen, allows the ribbon to be effectively employed and maintained in a variety of packaging systems and an oxygen scavenging material. The relationship between these two components varies depending on the nature of the oxygen scavenger and will become clear with respect to the following discussion relating to the oxygen scavenging materials employed in the present invention.

The particular oxygen scavenging material is not critical to the present invention, however, as will be apparent to those skilled in the art, the choice of a particular oxygen scavenging material will influence the exact structure of the resulting ribbon.

The present invention typically involves the use of organic oxygen scavenging materials which are recognized in the art. The organic oxygen scavenging material may be an organic compound such as squalene or dehydrated caster oil as disclosed in EP 0 507 207, which is incorporated by reference in its entirety herein. This organic compound may be blended with a polymer carrier, which itself may or may not scavenge oxygen.

Alternatively, the organic oxygen scavenging material may be layer laminated to another layer such as a polymeric selective barrier layer and/or a heat sealable layer which arrangements are discussed in detail below. In this regard, the organic oxygen scavenging material may be coated onto a polymer layer or onto a multilayer structure, in which case the organic oxygen scavenging material normally forms its own layer.

In such embodiments, the organic scavenging material is typically a polymer having oxidizable sites in the polymer and containing a catalyst such as a transition metal salt that assists initiation of oxidation of the oxidizable sites. Examples of polymers having oxidizable sites include polybutadiene, disclosed in U.S. Pat. No. 5,211,875; poly (meta-xylenediamine-adipic acid) (also known as MXD-6), disclosed in U.S. Pat. Nos. 5,021,515 and 5,049,624, each of which is incorporated by reference in its entirety herein for all purposes.

As discussed previously, because such oxygen scavenging materials can release oxidation products which are determined to be undesirable, this invention can also comprise the use of a polymeric material which functions as a selective barrier to certain oxidation products but not to oxygen (also called a polymeric selective barrier layer herein).

The oxidation products in question are often odorous and/or considered not generally recognized as safe (GRAS) food additives by the FDA. These oxidation products result from oxidation of the particular organic oxygen scavenging material utilized. Examples of these oxidation products include carboxylic acids, such as acetic, propionic, butyric, and valeric acids; aldehydes, such as acetaldehyde; ketones, such as acetone and methyl ethyl ketone; esters, such as methyl formate; and other compounds such as isophthalic acid, isophthalic amide, and 1,6- hexanoic diacid.

In one preferred embodiment involving a multi-layer design, a polymeric layer functions as a barrier when it completely blocks an oxidation product or when it impedes migration of an oxidation product to an extent that the amount of oxidation product found in the enclosed volume after 5 days at 49° C. produces slight to no odor in the case of odorous compounds or is within a U.S. Food and Drug Administration guideline for extractives in the case of compounds which are not generally regarded as safe. See 21 C.F.R. §§ 170–199 and *Recommendations for Chemistry Data for Indirect Food Additive Petitions*, published by the U.S. Food and Drug Administration, Sep. 1988, Version 1.2, Mar. 1993, each of which is incorporated in its entirety herein.

The polymeric selective barrier layer does not necessarily impede migration of all oxidation products. For example, it is not necessary that the polymeric selective barrier layer impedes migration of oxidation products such as carbon dioxide, water or compounds affirmed, as GRAS. Therefore, these oxidation products may migrate through the polymeric selective barrier layer to the extent recognized as safe by the FDA. Also, the polymeric selective barrier layer may impede migration of many but not all of the oxidation products whose migration is to be impeded.

In one preferred embodiment, a layer is considered to be a polymeric selective barrier layer when it prevents at least about half of the number and/or amount of oxidation products having a boiling point of at least about 75° C. from passing through the polymeric selective barrier layer from the layer carrying the organic oxygen scavenging material.

The polymeric selective barrier layer also permits oxygen to migrate through it to contact the layer carrying an organic oxygen scavenging material. In one preferred embodiment, the polymeric selective barrier layer permits enough oxygen to migrate through it such that the effective oxygen scavenging rate from the packaged volume for the composition of this invention (i.e., oxygen scavenging layer with polymeric selective barrier layer present) is at least about 0.1 cc $O_2$/gm of organic oxygen scavenging material/day/atm. Preferably, the polymeric selective barrier layer allows enough oxygen to migrate through it from the packaged volume such that the oxygen scavenging rate for the oxygen scavenging layer is at least about 1, and more preferably, about 5 cc $O_2$/gm of organic oxygen scavenging material/day/atm.

In a preferred embodiment, the polymeric selective barrier layer has an oxygen transmission rate (OTR) of at least about 1 cc $O_2$/100 in.$^2$ polymeric selective barrier layer 1 mil/day/atm., as measured by ASTM D-3985, which is incorporated by reference in its entirety herein. Preferably, the OTR is at least about 5, and more preferably, at least about 10, cc $O_2$/100 in.$^2$ polymeric selective barrier layer 1 mil/day/atm.

The glass transition temperature ($T_g$) as measured by ASTM D-3418, which is incorporated by reference in its entirety herein, has been found to provide a means for determining whether a polymeric layer will be an effective polymeric selective barrier layer to many of the odorous and/or nonconsumable oxidation products. Generally, if the $T_g$ of a polymeric layer is at least about 5° C. above the use temperature of the composition of this invention, the polymeric layer will be a polymeric selective barrier layer. Preferably, the $T_g$ of a polymeric selective barrier layer is at least about 10° C. above, and more preferably is at least about 20° C. above, the use temperature.

For some polymers, it may be necessary to orient the polymer in order for it to be an effective polymeric selective barrier layer. See U.S. Pat. Nos. 3,903,294, 3,880,974, 3,857,917 and 3,510,552, all of which are incorporated by reference in their entirety herein, for some examples of methods of orienting polymers. Where it is necessary to orient a polymer to make it an effective polymeric selective barrier layer, the use temperature of that polymer is the highest temperature to which the polymeric selective barrier layer is exposed after orienting the polymer. The use temperature in this case may be encountered at any time after which the polymer has been oriented, such as during film processing, during lamination or during the time that the oriented polymer is to function as a selective barrier. Of course, if the polymeric selective barrier layer is exposed to a higher temperature than the use temperature but is subsequently oriented, the use temperature is the highest temperature to which the polymeric selective barrier layer is exposed after this subsequent orientation of the polymer layer.

It has also been found that certain polymeric layers that have been oriented (i.e., stretched in at least one direction in the plane of the layer) are effective polymeric selective barrier layers. For example, oriented polyethylene terephthalate (OPET), biaxially oriented polyethylene terephthalate (BOPET) and biaxially oriented nylon-6 are each effective polymeric selective barrier layers to many of the oxidation products of polymeric oxygen scavenging material. The use temperature in this case may be encountered at any time after which the polymer has been oriented, such as during film processing, during lamination or during the time that the oriented polymer is to function as a selective barrier. Of course, if the polymeric selective barrier layer is exposed to a higher temperature than the use temperature but is subsequently oriented, the use temperature is the highest temperature to which the polymeric selective barrier layer is exposed after this subsequent orientation of the polymer layer. The use temperature in this case may be encountered at any time after which the polymer has been oriented, such as during film processing, during lamination or during the time that the oriented polymer is to function as a selective barrier. Of course, if the polymeric selective barrier layer is exposed to a higher temperature than the use temperature but is subsequently oriented, the use temperature is the highest temperature to which the polymeric selective barrier layer is exposed after this subsequent orientation of the polymer layer.

For polymers in which orientation of the film is not necessary for the polymer to be an effective polymeric selective barrier layer, the use temperature is the temperature to which the composition of this invention is exposed while the composition is scavenging oxygen from the packaged volume and protecting the contents (ex. food) of the container into which the composition of this invention has been incorporated. For example, if the composition of this invention is incorporated into meat packaging, the use temperature would be the highest temperature that the meat package would encounter while the composition of this invention was scavenging oxygen to protect the meat from the oxygen.

It is theorized that polymers having particular crystalline and/or ordered structures, as indicated by the $T_g$, by the polymer crystallinity, and/or by the fact that the polymer has been oriented, provide channels within the polymer having dimensions that selectively block the diffusion of some larger molecules, such as odorous or extractive oxidation products, yet permit smaller molecules such as oxygen to pass through the polymer. This theory is supplied only for the purpose of helping to explain why certain polymers are effective as polymeric selective barrier layers and is not limiting of the scope of this invention.

In one embodiment, the $T_g$ of the polymeric selective barrier layer is at least about 40° C. Preferably, the $T_g$ of the polymeric selective barrier layer is at least about 50° C., and more preferably the $T_g$ of the polymeric selective barrier layer is at least about 60° C.

Solubility of the oxidation products in the polymeric selective barrier layer also can be a factor in determining whether a selected polymer will act as a polymeric selective barrier layer. If an oxidation product is very soluble in a polymer, it is likely to migrate through the polymer, and therefore the polymer would not be useful as a polymeric selective barrier layer. An oxidation product that is soluble in a polymer can change the $T_g$ of the polymer. As a result, a polymer having a $T_g$ sufficient to block oxidation products may have its $T_g$ reduced by an oxidation product to a level that the polymer cannot be used as a polymeric selective barrier layer. Since this effect occurs over time, a polymer may be an effective polymeric selective barrier layer in some applications, such as where the food product contained within the package is consumed shortly after packaging, but may not be an effective polymeric selective barrier layer in other situations, such as where the food product is expected to have a shelf-life of many years.

A polymeric selective barrier layer may contain plasticizers such as phthalate esters and/or polyethylene glycols. A polymeric selective barrier layer may be a blend of polymers, such as a compatibilized blend including PET or nylon-6 which is then oriented. The polymeric selective barrier layer may be modified for example, with fillers such as calcium carbonate and/or $TiO_2$. The polymeric selective barrier layer may also be a "multi-layer" construction in which any one layer alone does not necessarily qualify as a polymeric selective barrier layer, but together the multi-layer construction is a polymeric selective barrier layer.

When the polymeric selective barrier layer is an oriented layer such as OPET or oriented nylon, the polymeric selective barrier layer may be oriented prior to it being co-laminated with the layer carrying an organic oxygen scavenging material. Alternatively, an unoriented polymeric selective barrier layer may be coextruded with the layer carrying an organic oxygen scavenging material, and this multi-layer structure may then be oriented.

In one preferred embodiment of the invention, the ribbon comprises an arrangement in which the oxygen scavenging material is covered, and preferably completely encompassed by a polymeric selective barrier layer. Furthermore, the heat sealable polymer is then introduced as the outside layer of the ribbon, preferably completely encompassing the barrier layer thereby forming an arrangement as in FIG. 1.

Suitable heat sealing materials for use in the present invention are those heat sealable resins recognized in the art and can include ionomers and terpolymers such as ethylene-vinyl acetate, ethylene-methyl acrylate, low density polyethylene (LDPE), linear low density polyethylene (LLDPE), ethylene-sodium acrylate, ethylene-zinc acetate, ethylene-acrylic acid-sodium acrylate, and ethylene-acrylic acid-zinc acetate.

The amount of the components employed are clearly dependent upon the particular application, i.e., the size of the packaging, the materials being packaged, the amount of oxygen that must be removed, and the like, and as such are readily determinable by those skilled in the art.

For sake of completeness, in the preferred embodiment discussed above, the dimensions can vary but the total weight is typically about 0.1–25 g, with the selective barrier layer having a thickness of about 0.1–5 mil, and a heat seal layer of 0.1 to 10 mil. Moreover, for a preferred 2–3 g ribbon, the capacity of $O_2$ absorption is from 10–500 cc/ribbon.

These oxygen scavenging ribbons can be produced by means well recognized in the art. For example, the above multilayered ribbon can be produced by suitable means such as multi-layer casting. In this regard, the casting can be performed such that the outer layers have a greater width that the inner layer and thus, complete encompass the inner layer.

In an alternative embodiment, the ribbon can be in the form of a long "tube" produced by art recognized techniques, e.g., blown film extrusion.

In this embodiment, the ribbon structure can be a multi-layer structure having an outer heat sealable layer, followed by a barrier layer, the oxygen scavenging material containing layer, and another optional, inner layer also comprising the heat sealable polymeric material. See, for example, the cross-section of a tube illustrated by FIG. 2.

Yet another embodiment of the oxygen scavenging material according to the present invention involves the use of oxygen scavenging powders traditionally employed within sachets such as "Ageless", an oxygen scavenging powder available from Mitsubishi Gas Chemical Co. These powders, which upon oxidation do not give off the undesirable products discussed above, can be blended directly into a suitable heat sealable resin and then extruded or otherwise formed into the desired ribbon shape.

Examples of suitable resins for use in this embodiment of the invention include Chevron LLDPE-6335 thermoplastic resin and Chevron EMAC® SP-2207 resin. Furthermore, the powder is introduced in an amount of 5 to 80% by weight, preferably about 20% by weight.

In addition, the present invention can include additives which would not adversely effect the oxygen scavenging ability of the ribbon. Examples of such additives include color indicators, i.e., materials introduced into the ribbon which will effectively change the color of the ribbon upon oxidation of the oxygen scavenger.

In another aspect, the present invention relates to articles including oxygen-sensitive products, e.g., food packages and the like, containing the oxygen scavenging ribbons according to the present invention. The ribbons can be introduced into rigid barrier packaging such as bottles or boxes, flexible barrier packaging such as bags, or tray containers such as polystyrene thermal storage trays.

Two examples of suitable means for introducing a film into the particular environment are provided by FIGS. 3 and 4. In each case, the ribbon is separately introduced into the packaging system prior to heat sealing of the package. The particular technique is not critical and can include a variety of art-recognized systems which would allow for the separate introduction of the ribbons into the packaging. Typically, in these systems a roll of the ribbon is triggered off line from the packaging film material and then fed continuously into the film line during the packaging process. The ribbon is then cut and sealed with the film material itself.

The use of oxygen scavenging ribbons according to the present invention has a number of advantages over traditional scavenging techniques including separate storage of the film and thus greater control over the shelf life of the ribbon, the ability to introduce a single ribbon into very different types of packaging materials and in differing amounts to satisfy different packaging needs, the ability to employ triggering/activation means which are separate from and will not influence the structure of the packaging material itself, the ability to seal the ribbon at two separate locations within the packaging material so as to substantially reduce or eliminate any accidental ingestion of the antioxidant material.

In particular, the present invention is capable of being tailored for the individual needs of a particular package. For example, in the food environment, different foods can have different optimal oxygen scavenging demands. The present invention allows for these differences to be considered, for example, the size of the ribbon can be altered, without altering the packaging, e.g., box or bag, size. Such flexibility can significantly increase the cost efficiency of a packaging system. Moreover, the present invention provides this flexibility while at the same time solving many of the problems present within existing scavenging technologies.

The invention will now be further discussed with reference to the following illustrative examples:

EXAMPLES

Example 1: Production of Oxygen Scavenging Ribbon by Multi-Layer Casting

In FIG. 1, a 4 inch wide, 3 mil thick oxygen scavenging ribbon with an "ABCBA" structure is prepared in Randcastle mini-extruder by coextrusion of (A) a Chevron EMAC® SP-2207 heat seal adhesive resin, (B) an Allied Signal Nylon 6 resin, and (C) an MXD-6 nylon containing 1000 ppm of cobalt ion oxygen scavenging compound.

When properly adjusted, the width of the outer layers is always wider than the inner layers to provide a complete seal of the oxygen scavenging material.

Example 2: Production of Oxygen Scavenging Ribbon by Blown Film Extrusion

A tubular ribbon structure as illustrated by FIG. 2 is made by 4 layer blown film process with the outer film, 1, being EMAC® resin, followed by a barrier layer, 2, Nylon 6, an oxygen scavenging material layer, 3, comprising MXD-6, and another optional inner layer, 4, of EMAC® resin.

This tube shape ribbon can be used just as the flat ribbon for sealing into flexible bags or rigid trays.

Example 3: Production of Thermoplastic Ribbon Filled With "Ageless" Oxygen Scavenging Powder Similar to Example 1, a Chevron LLDPE-6335 thermoplastic resin filled with 20 weight % of Ageless oxygen scavenging powder under anaerobic condition is extruded into a single layer 2 mil film which is immediately stored in nitrogen.

No polymeric selective barrier layer or separate heat seal layer is needed since ageless does not give organic fragments and LLDPE is a good heat seal layer.

Example 4: Incorporation of Oxygen Scavenging Ribbon into Flexible Barrier Food Packaging In FIG. 3, a 4 inch wide, 3 mil thick oxygen scavenging ribbon, 5, produced in accordance with Example 1 is triggered by a suitable means to activate oxygen scavenging capability, and is then fed along with the packaging film, 6, into a vertical fill food packaging machine, 7. After the food loading, it is sealed, 8, and die-cut, 9, along with the package to give structure 10.

Example 5: Incorporation of Oxygen Scavenging Ribbon into Rigid Barrier Food Packaging In FIG. 4, a 2 inch wide, 2 mil thick layer oxygen scavenging ribbon, 11, produced in accordance with Example 2 is fed along with a lidding film, 12. The ribbon is optionally triggered/activated by a suitable means, 15, e.g., a UV or corona discharge, before being introduced into a lidding packaging machine, 13. The lidding film is a barrier layer has a composition of HDPE/EMAC® resin/EVOH/EVA and the resulting food package, 14, containing the ribbon is provided.

The principles preferred embodiments, and modes of operation of the present invention have been described in the foregoing. The invention however, is not to be limited to the particular embodiments disclosed since they are illustrate only in scope. Various modifications, substitutions, and omissions may be made by those skilled in the art without departing from the spirit of the invention. Accordingly, it is intended that the scope of the present invention be limited solely by the following claims including equivalents thereof.

What is claimed is:

1. A package material having an oxygen scavenging article located therein, wherein said article is heat sealed at two ends of said package material and the majority of the article remains unattached to said package material, said article comprising a heat sealable polymer resin layer as an exterior surface of the article, an oxygen scavenging material layer, and a polymeric selective barrier layer between the oxygen scavenging material layer and the heat sealable polymer layer.

2. The packaging material according to claim 1 wherein the barrier layer comprises at least one unoriented, oriented or biaxially oriented, nylon, nylon 6 or PET resin.

3. The packaging material according to claim 1 wherein the oxygen scavenging material comprises a poly(metaxylenediamine-adipic acid) containing 1000 ppm of cobalt ion oxygen scavenging compound.

4. The packaging material according to claim 1, said article being produced by multilayer castings so as to produce a product in which the outer layers completely encompass the inner layers.

5. The packaging material according to claim 1, wherein said article comprising a ribbon having a tubular shape in which the oxygen scavenging material is located in a layer inside a heat sealable resin layer.

6. The packaging material according to claim 1, said article further comprising an innermost layer which comprises a heat sealable resin.

7. The packaging material according to claim 6 wherein the barrier layer comprises at least one unoriented, oriented or biaxially oriented, nylon, nylon 6 or PET resin.

8. The packaging material according to claim 6 wherein the oxygen scavenging material comprises a poly(metaxylenediamine-adipic acid) containing 1000 ppm of cobalt ion oxygen scavenging compound.

9. The packaging material according to claim 6, where the ribbon is produced by blown film coextrusion.

10. The packaging material according to claim 1, said article comprising (a) a plurality of patches which each comprise the heat sealable resin layer, the polymeric selective barrier layer, and the oxygen scavenging material layer and (b) a support type, where the patches are located on the support tape.

11. The packaging material according to claim 10 wherein the support tape is longitudinal.

12. The packaging material according to claim 1 wherein the article is a ribbon comprising the heat sealable resin and the oxygen scavenging material is an oxygen scavenging powder that does not produce oxidation products which are either odorous or not GRAS food additives, and the heat sealable resin is blended with the oxygen scavenging powder.

13. The packaging material according to claim 12 wherein the oxygen scavenging powder comprises an iron containing composition.

14. A process for the production of the packaging material of claim 1, comprising producing the oxygen scavenging article by the multi-layer casting of a multi-layer film comprising an outer layer and an inner layer, with the multi-layer casting comprising the layers of (a) a heat sealable resin, (b) a polymeric selective barrier resin and (c) an oxygen scavenging material, such that the width of the outer layer is wider than that of the inner layer so as to provide a seal of the inner layers within the outer layers.

15. A process for the production of the packaging material of claim 5, comprising producing the oxygen scavenging article by the multilayer blown film coextrusion of an outer layer comprising a heat sealable resin, followed by a polymeric selective barrier layer and then an oxygen scavenging material.

16. The process according to claim 15 further comprising the blown film coextrusion of an innermost layer comprising a heat sealable resin.

17. The packaging material according to claim 1 wherein the package material is a tray container.

18. The packaging material according to claim 1 wherein the article is heat sealed at two locations.

19. The package material of claim 1, wherein the package material is in the form of a bag.

20. The package material according to claim 1, wherein the package material is in the form of a bottle or a box.

21. The process of claim 14, wherein the oxygen scavenging article and packaging material are fed continuously during the process and the oxygen scavenging article is cut and sealed together with the packaging material.

* * * * *